(12) United States Patent
Chang et al.

(10) Patent No.: US 9,581,823 B2
(45) Date of Patent: Feb. 28, 2017

(54) 2D/3D SWITCHABLE DISPLAY DEVICE AND MANUFACTURING METHOD THEREOF

(71) Applicant: Au Optronics Corporation, Hsinchu (TW)

(72) Inventors: Chi-Ho Chang, New Taipei (TW); Ping-Feng Yu, Taoyuan County (TW)

(73) Assignee: Au Optronics Corporation, Hsinchu (TW)

( * ) Notice: Subject to any disclaimer, the term of this patent is extended or adjusted under 35 U.S.C. 154(b) by 497 days.

(21) Appl. No.: 14/083,419

(22) Filed: Nov. 18, 2013

(65) Prior Publication Data

US 2014/0375905 A1    Dec. 25, 2014

(30) Foreign Application Priority Data

Jun. 25, 2013 (TW) .............................. 102122584 A

(51) Int. Cl.
| | |
|---|---|
| *G02F 1/1347* | (2006.01) |
| *G02B 27/22* | (2006.01) |
| *G06F 3/041* | (2006.01) |
| *H04N 13/04* | (2006.01) |

(52) U.S. Cl.
CPC ......... *G02B 27/2214* (2013.01); *G02F 1/1347* (2013.01); *G06F 3/0412* (2013.01); *G06F 2203/04103* (2013.01); *H04N 13/0404* (2013.01)

(58) Field of Classification Search
CPC .................... G02B 27/2214; H04N 13/0404
See application file for complete search history.

(56) References Cited

U.S. PATENT DOCUMENTS

| | | | |
|---|---|---|---|
| 8,736,546 B2 | 5/2014 | Oh et al. | |
| 8,823,888 B2 | 9/2014 | Tsai et al. | |
| 2010/0091204 A1* | 4/2010 | Chen .................. | G02B 27/2214 349/15 |
| 2011/0096251 A1 | 4/2011 | Son et al. | |
| 2011/0234934 A1* | 9/2011 | Chang ................... | G02C 7/083 349/43 |
| 2012/0013606 A1 | 1/2012 | Tsai et al. | |

(Continued)

FOREIGN PATENT DOCUMENTS

| | | |
|---|---|---|
| CN | 102053427 | 5/2011 |
| CN | 102053427 A | 5/2011 |

(Continued)

*Primary Examiner* — Phu Vu
(74) *Attorney, Agent, or Firm* — Jianq Chyun IP Office

(57) ABSTRACT

A 2D/3D switchable display device including a display panel and a switch unit is provided. The display panel includes a first substrate, a second substrate and a display unit located between the first and second substrates. The first substrate includes a first surface and a second surface opposite to the first surface, and the display unit is located above the first surface. The switch unit located on the second surface includes a third substrate, a first electrode layer, a second electrode layer and a switchable medium layer between the first and second electrode layers. The second electrode layer is located on the second surface, the first electrode layer is located on the third substrate, and the switchable medium layer and the third substrate are respectively located on two opposite surfaces of the first electrode layer. A manufacturing method of a 2D/3D switchable display device is also provided.

13 Claims, 18 Drawing Sheets

(56) References Cited

U.S. PATENT DOCUMENTS

2012/0287108 A1  11/2012  Oh et al.
2014/0327849 A1  11/2014  Tsai et al.

FOREIGN PATENT DOCUMENTS

| | | |
|---|---|---|
| CN | 102081257 | 6/2011 |
| CN | 102385195 | 3/2012 |
| CN | 102608789 | 7/2012 |
| CN | 102650753 | 8/2012 |
| CN | 102789084 | 11/2012 |
| CN | 102822778 | 12/2012 |
| TW | M413123 | 10/2011 |
| TW | 201205118 | 2/2012 |
| TW | 201232352 | 8/2012 |
| TW | 201245801 | 11/2012 |
| TW | 201303422 | 1/2013 |
| WO | 2011125373 | 10/2011 |

* cited by examiner

2D/3D SWITCHABLE DISPLAY DEVICE AND MANUFACTURING METHOD THEREOF

CROSS-REFERENCE TO RELATED APPLICATION

This application claims the priority benefit of Taiwan application serial no. 102122584, filed on Jun. 25, 2013. The entirety of the above-mentioned patent application is hereby incorporated by reference herein and made a part of this specification.

TECHNICAL FIELD

The disclosure relates to a display panel and a manufacturing method thereof, and more particularly, to a two-dimensional/three-dimensional (2D/3D) switchable display device and a manufacturing method thereof.

BACKGROUND

In recent years, as display technology continuously advances, users have become more and more demanding on display quality of displays, such as image resolution, color saturation, and so forth. In process of purchasing a display, whether or not the display is capable of displaying a 3D image is also taken into consideration in addition to high image resolution and high color saturation.

Currently, a fixed beam splitter is mainly employed in a 3D image display technique, such as adhering a parallax barrier or a lenticular lens onto a display panel to respectively project an image provided by the display panel to the left and right eyes of an user, thereby forming a 3D image in the human brain through binocular parallax generated after the two eyes respectively received the image. It should be noted that a 3D image can be produced by employing a fixed beam splitter in a spatial-multiplexed manner, such that the resolution of the 3D image is reduced although a 3D display effect of a display panel can be achieved. Besides, the 3D display equipped with the fixed beam splitter can only display 3D images but not 2D images. Thus, the practicality of such 3D display is relatively low.

To resolve said issue, a 2D/3D switchable display device including a switch unit and a display panel has been developed under the existing techniques. In general, the switch unit includes two substrates, electrode layers respectively disposed on the two substrates, and a liquid crystal layer disposed between the two substrates. The 2D/3D switchable display device mainly utilizes the optical characteristics of the liquid crystal layer to control display light, so that the switch unit has the splitting ability. By this way, the 2D/3D switchable display device is capable of displaying 2D images when the switch unit is turned off and displaying 3D images when the switch unit is turned on.

However, the current 2D/3D switchable display device at least needs to include two substrates for the display panel and two substrates for the switch unit, which the total number of substrates comes to four. As such, under the condition that the thickness of the display device can not be further reduced, the applications thereof will be limited and its commercial competitiveness will also be decreased.

SUMMARY

The disclosure is directed to a 2D/3D switchable display device, which has a relative thin overall thickness.

The disclosure is directed to a manufacturing method of a 2D/3D switchable display device, which is capable of manufacturing a 2D/3D switchable display device with a relative thin overall thickness.

The disclosure provides a 2D/3D switchable display device, which includes a display panel and a switch unit. The display panel includes a first substrate, a second substrate and a display unit located between the first substrate and the second substrate, in which the first substrate has a first surface and a second surface opposite to the first surface, and the display unit is located above the first surface. The switch unit located on the second surface includes a third substrate, a first electrode layer, a second electrode layer and a switchable medium layer located between the first electrode layer and the second electrode layer, in which the second electrode layer is located on the second surface, the first electrode layer is located on the third substrate, and the switchable medium layer and the third substrate are respectively located on two opposite surfaces of the first electrode layer.

The disclosure provides a manufacturing method of a 2D/3D switchable display device, which includes the following steps: foil ling a display unit between a first substrate and a second substrate to form a display panel, in which the first substrate has a first surface and a second surface opposite to the first surface, and the display unit is located above the first surface; and forming a switch unit on the second surface of the first substrate, the switch unit includes a third substrate, a first electrode layer, a second electrode layer and a switchable medium layer located between the first electrode layer and the second electrode layer, in which the second electrode layer is located on the second surface, the first electrode layer is located on the third substrate, and the switchable medium layer and the third substrate are respectively located on two opposite surfaces of the first electrode layer.

To recapitulate, the number of the required substrates in the 2D/3D switchable display device of the disclosure can be reduced by disposing the second electrode layer of the switch unit on the first substrate of the display panel. Thus, as compared with the existing 2D/3D switchable display device constituted by having the display panel with two substrates and the switch unit with two substrates stacked to each other, the 2D/3D switchable display device of the disclosure can have a relatively low number of substrates, thereby having a relative thin overall thickness.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
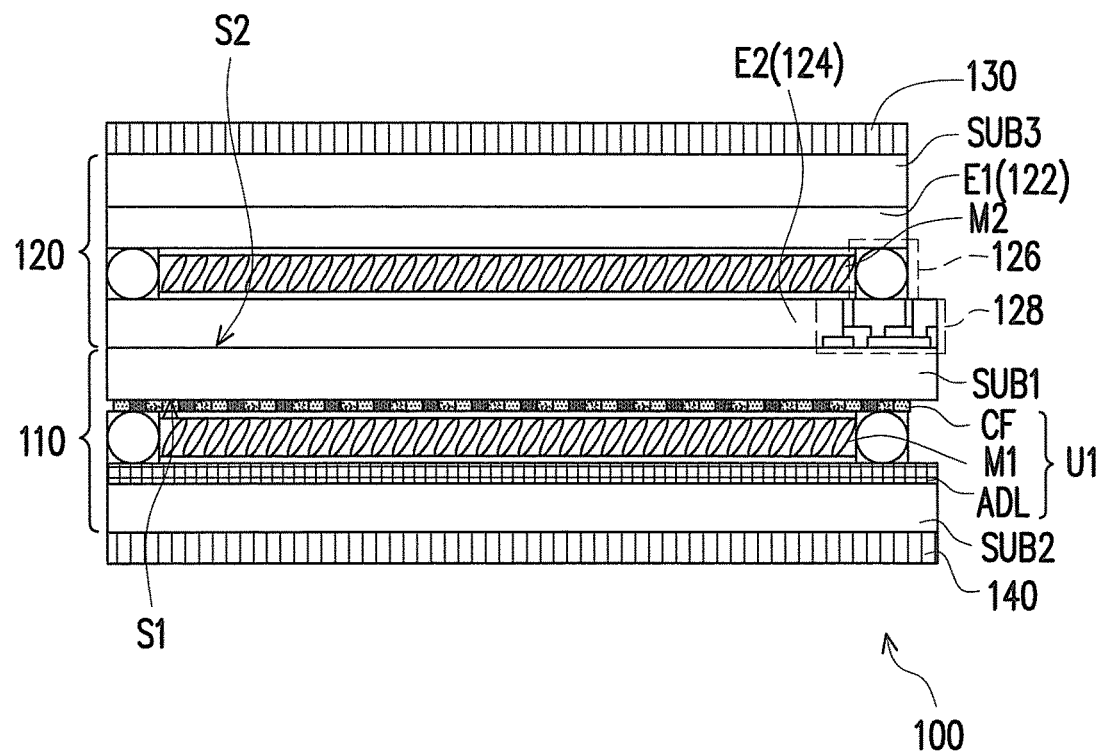
FIG. 1 is a schematic cross-sectional diagram illustrating a 2D/3D switchable display device according to an embodiment of the disclosure.

FIG. 1 is a schematic cross-sectional diagram illustrating a 2D/3D switchable display device according to an embodiment of the disclosure. Referring to FIG. 1, the 2D/3D switchable display device 100 of the embodiment includes a display panel 110 and a switch unit 120, in which the switch unit 120 is located on a surface of the display panel 110. The display panel 110 can be a liquid crystal display panel or an organic electroluminescent display panel, where the display panel 110 of the embodiment is taken the liquid crystal display panel for illustration.

In detail, the display panel 110 includes a first substrate SUB1, a second substrate SU2 and a display unit U1 between the first substrate SUB1 and the second substrate SUB2, in which the first substrate SUB1 has a first surface S1 and a second surface S2 opposite to the first surface S1, the display unit U1 is located above the first surface S1 and the switch unit 120 is located on the second surface S2. Namely, the first substrate SUB1 is located between the display unit U1 and the switch unit 120.

In the embodiment, the display unit U1 includes an active device array layer ADL, a color filter layer CF and a display medium layer M1 located between the active device array layer ADL and the color filter layer CF. In detail, the active device array layer ADL is located on the second substrate SUB2 and is located between the display medium layer M1 and the second substrate SUB2, while the color filter layer CF is located on the first surface S1 and is located between the display medium layer M1 and the first substrate SUB1, although the disclosure is not limited thereto. In other embodiments, the active device array layer ADL can also be located on the first surface S1 and can be located between the display medium layer M1 and the first substrate SUB1, while the color filter layer CF can also be located on the second substrate SUB2 and can be located between the display medium layer M1 and the second substrate SUB2. Alternatively, the display unit U1 may include an array on color filter substrate (AOC substrate) or a color filter on array substrate (COA substrate) located on one of the first substrate SUB1 and the second substrate SUB2. In addition, the display medium layer M1 of the embodiment can be a liquid crystal layer, although the disclosure is not limited thereto. For example, when the display panel 110 is the organic electroluminescent display panel, the display medium layer M1 may employ an organic light-emitting layer.

Moreover, the switch unit 120 of the embodiment includes a third substrate SUB3, a first electrode layer 122, a second electrode layer 124 and a switchable medium layer M2, in which the third substrate SUB3 and the first substrate SUB1 are disposed opposite to each other. The first electrode layer 122, the second electrode layer 124 and the switchable medium layer M2 are located between the third substrate SUB3 and the first substrate SUB1. Specifically, the second electrode layer 124 is located on the second surface S2 of the first substrate SUB1, the first electrode layer 122 is located on the third substrate SUB3, and the switchable medium layer M2 is located between the first electrode layer 122 and the second electrode layer 124, for instance. In other words, the switchable medium layer M2 and the third substrate SUB3 are respectively located on two opposite surfaces of the first electrode layer 122, and the switchable medium layer M2 and the first substrate SUB1 are respectively located on two opposite surfaces of the second electrode layer 124.

The switch unit 120 of the embodiment may further includes sealants (which includes conductive particles) 126 and an outer lead bonding (OLB) region 128, in which the OLB region 128 is located on the second surface S2 of the first substrate SUB1, and is located at a region outside the second electrode layer 124 on the second surface S2, where the sealants are located between the third substrate SUB3 and the first substrate SUB1. In the embodiment, the sealants 126 can be located between the first electrode layer 122 and the second electrode layer 124 and between the first electrode layer 122 and the OLB region 128, and the switchable medium layer M2 is disposed therebetween.

In addition, the switchable medium layer M2 of the embodiment can be a liquid crystal layer. In the embodiment, the optical characteristics of the switchable medium layer M2 (i.e., the liquid crystal layer) are utilized to control display light, so that the switch unit 120 has the splitting ability to respectively project a display image provided by the display panel 110 to the left and right eyes of an user, thereby forming a 3D image in the human brain through parallax effect generated after the two eyes respectively received the image. By this way, the 2D/3D switchable display device 100 is capable of displaying 2D images when the switch unit 120 is turned off (such as, under the condition that no voltage being applied to the first electrode layer 122 and the second electrode layer 124 of the switch unit 120, or both electrode layers are equipotential) and displaying 3D images when the switch unit 120 is turned on (which indicates the potential states of the first electrode layer 122 and the second electrode layer 124 in the switch unit 120 varies with time, so as to have the splitting ability equivalent to a lenticular lens).

Moreover, the 2D/3D switchable display device 100 of the embodiment may further include a first polarizing layer 130 and a second polarizing layer 140, so as to modulate the gray level of the display image outputted by the display panel 110, in which the first polarizing layer 130 and the second polarizing layer 140 can be the structure capable of polarizing light, such as a polarizer or a metal grid.

Specifically, the first polarizing layer 130 of the embodiment can be located on the third substrate SUB3, and the first polarizing layer 130 and the first electrode layer 122 are respectively located on two opposite surfaces of the third substrate SUB3, for instance. On the other hand, the second polarizing layer 140 can be located on the second substrate SUB2 of the display panel 110, and the second polarizing layer 140 and the switch unit 120 are respectively located on two opposite surfaces of the display panel 110, for instance.

In the embodiment, the number of the required substrates in the 2D/3D switchable display device 100 is reduced by disposing the second electrode layer 124 of the switch unit 120 on the first substrate SUB1 of the display panel 110. Thus, as compared with the existing 2D/3D switchable display device constituted by having the display panel with two substrates and the switch unit with two substrates stacked to each other, the 2D/3D switchable display device 100 of the embodiment can have a relatively low number of substrates (i.e., including the first substrate SUB1, the second substrate SUB2 and the third substrate SUB3), thereby having a relative thin overall thickness.

On the other hand, the overall thickness of the 2D/3D switchable display device 100 in the embodiment can be further reduced by thinning these substrates (i.e., including the first substrate SUB1, the second substrate SUB2 and the third substrate SUB3) of the 2D/3D switchable display device 100. To be more specific, the substrates may employ flexible substrates with a thickness below 0.2 mm. By this way, other than reducing the overall thickness of the 2D/3D switchable display device 100, the applications of the 2D/3D switchable display device 100 can be further increased and its commercial competitiveness can also be increased.

Figure 2A:
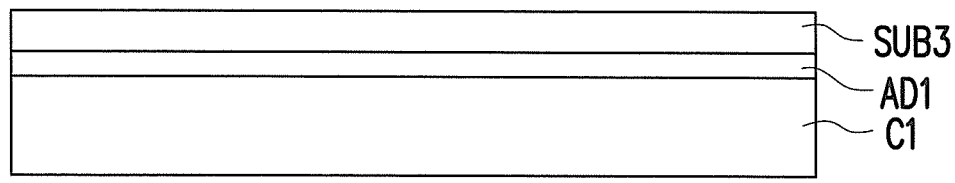
FIG. 2A through FIG. 2O are schematic diagrams illustrating a manufacturing process of a 2D/3D switchable display device in a cross-sectional view according to an embodiment of the disclosure.
Figure 2B:
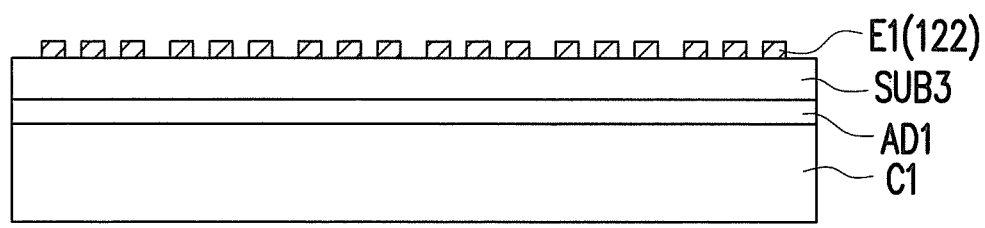
Figure 2C:
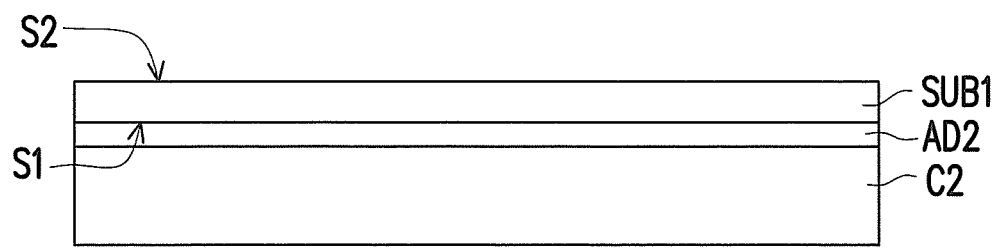
Figure 2D:
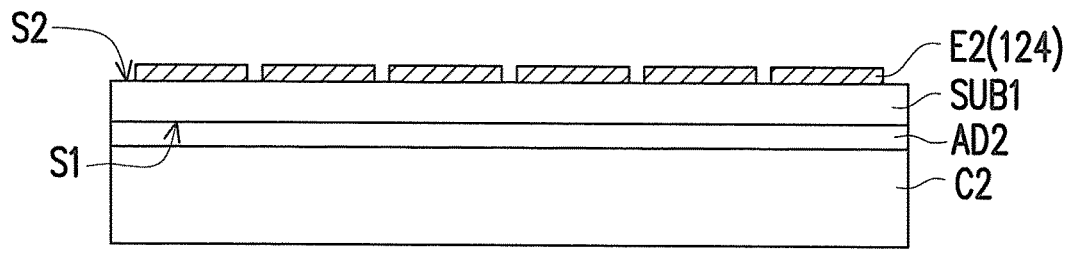
Figure 2E:
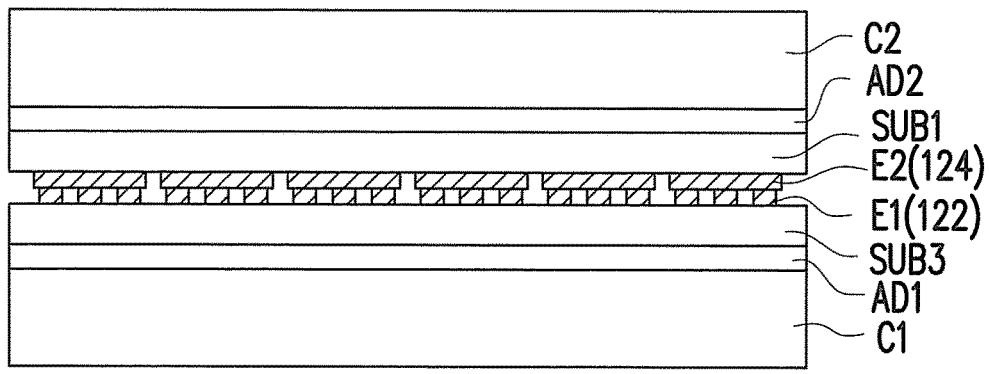
Figure 2F:
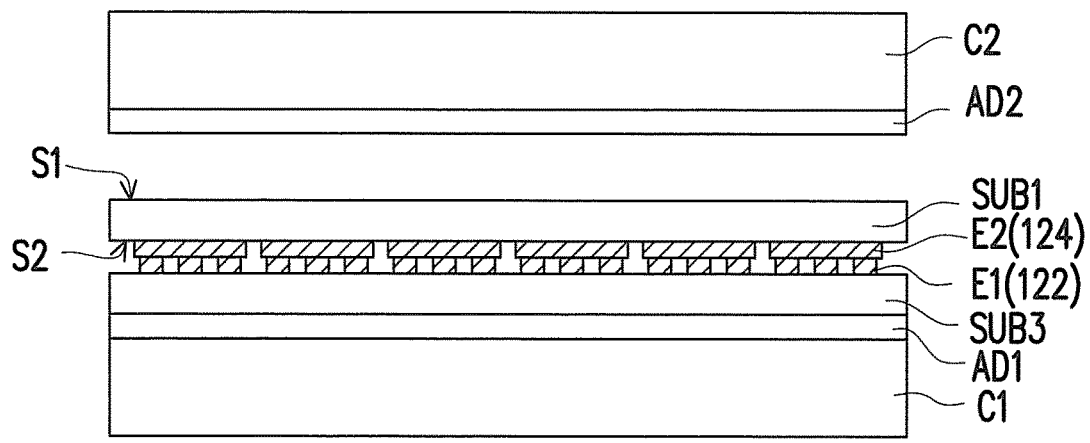
Figure 2G:
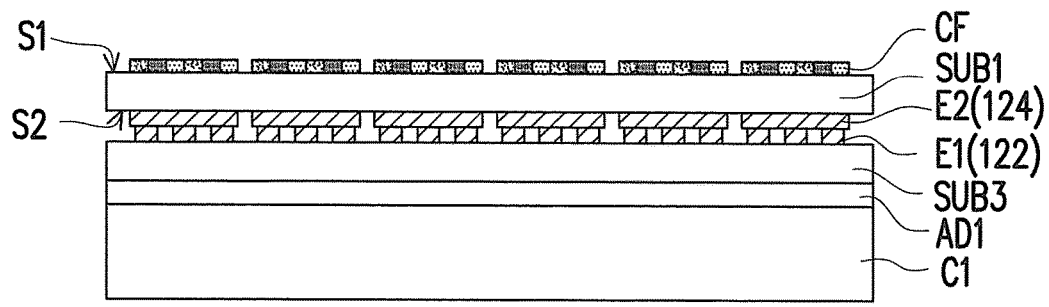
Figure 2H:
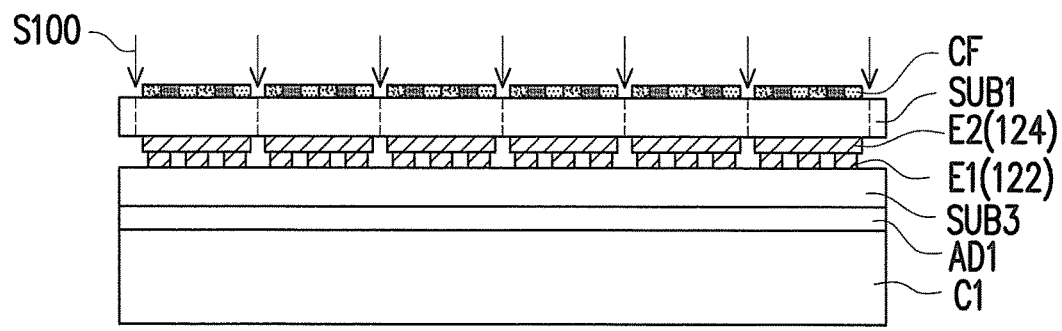
Figure 2I:
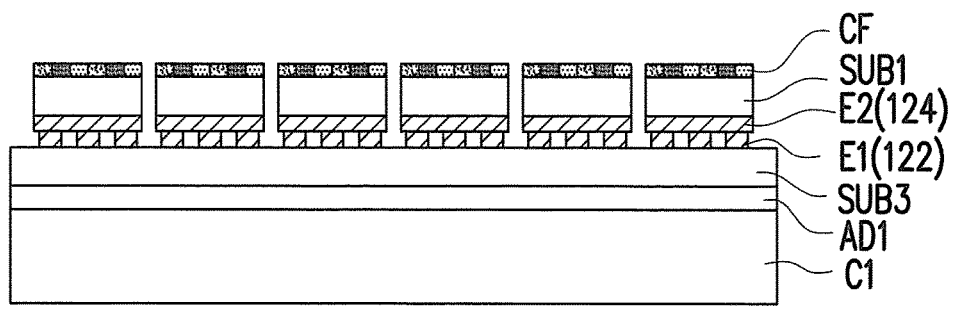
Figure 2J:
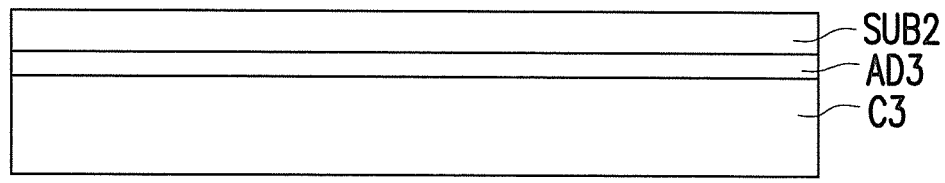
Figure 2K:
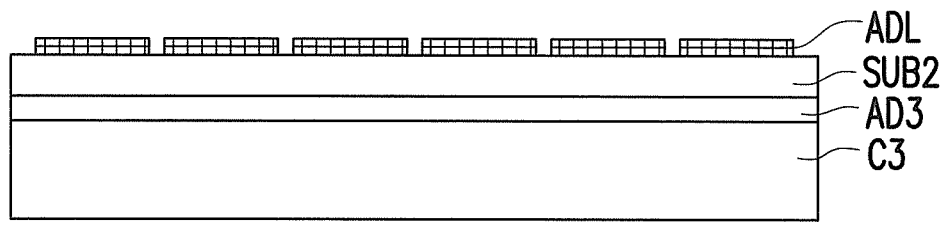
Figure 2L:
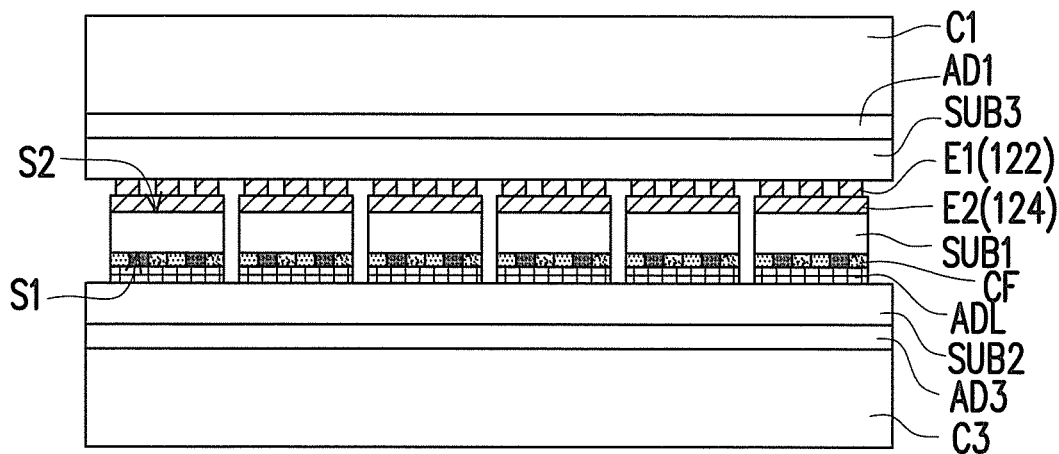
Figure 2M:
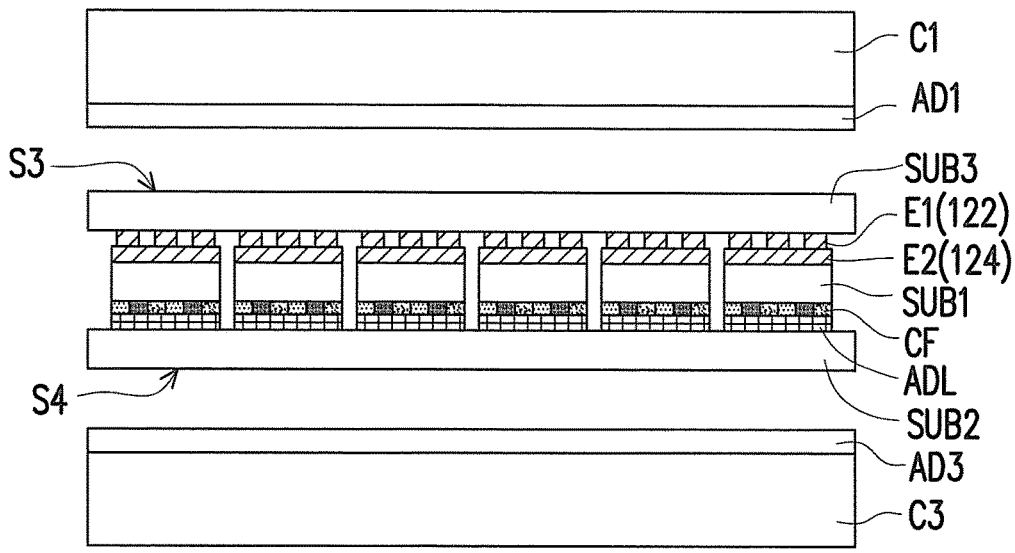
Figure 2N:
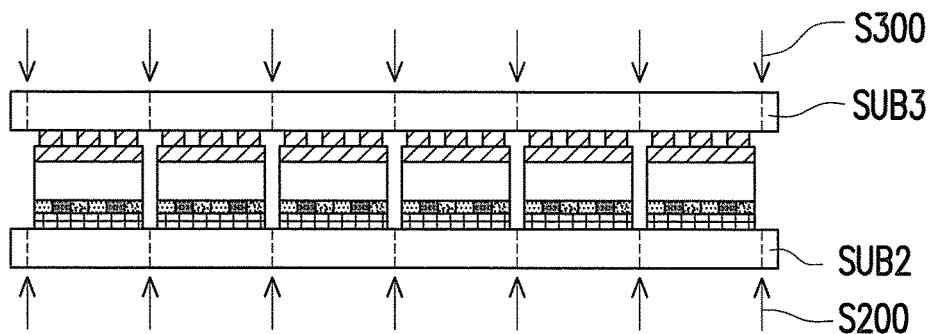
Figure 2O:
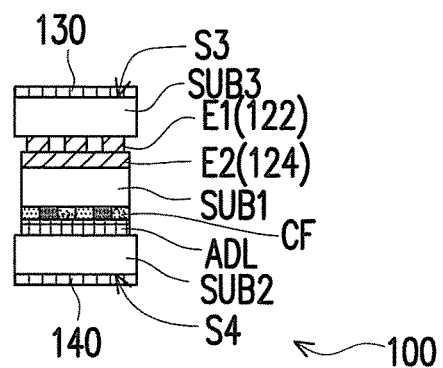

The following descriptions are taken FIG. 2A through FIG. 2O to illustrate a manufacturing process of the 2D/3D switchable display device 100 depicted in FIG. 1. In the embodiment, the steps of forming the 2D/3D switchable display device 100 can be forming the switch unit 120 (as shown in FIG. 2A through FIG. 2E) firstly, and then forming the display panel 110 (as shown in FIG. 2F through FIG. 2L), although the disclosure is not limited thereto.

Referring to FIG. 2A, the third substrate SUB3 is provided on a first carrier C1. In the embodiment, the third substrate SUB3 may employ a translucent flexible substrate with a thickness below 0.2 mm. For example, a material of the third substrate SUB3 can be glass, polyethylene terephthalate (PET), polyimide (PI), or other applicable materials. In addition, the first carrier C1 can employ a substrate with a thickness below 0.5 mm, in order to protect and carry the third substrate SUB3. On the other hand, the first carrier C1 and the third substrate SUB3 of the embodiment can be bonded to each other through an adhesive layer AD1.

Referring to FIG. 2B, the first electrode layer 122 is formed on the third substrate SUB3. In the embodiment, the first electrode layer 122 may include a plurality of first electrode patterns E1, in which a material of the first electrode layer 122 is preferably a transparent conductive material taking the light transmittance of the 2D/3D switchable display device 100 (shown in FIG. 1) and the prevention of the first electrode patterns E1 shielding the display image outputted by the display panel 110 (shown in FIG. 1) into consideration. The transparent conductive material can be a metal oxide, such as indium tin oxide (ITO), indium zinc oxide (IZO), aluminum zinc oxide (AZO), aluminum tin oxide (ATO), indium tin zinc oxide (ITZO), other applicable materials, or a stacked layer of at least two said materials.

Referring to FIG. 2C, the first substrate SUB1 is provided on a second carrier C2, and the first surface S1 of the first substrate SUB1 is located between the second carrier C2 and the second surface S2. In addition, the material and the thickness of the first substrate SUB1 can be the same as the third substrate SUB3, and the material and the thickness of the second carrier C2 can be the same as the first carrier C1. On the other hand, the second carrier C2 and the first substrate SUB1 of the embodiment can be bonded to each other through an adhesive layer AD2.

Referring to FIG. 2D, the second electrode layer 124 is formed on the second surface S2 of the first substrate SUB1, and in the embodiment, the OLB region (not shown here, with reference to FIG. 1) can be further formed on a region outside the second electrode layer 124 on the second surface S2. In the embodiment, the second electrode layer 124 may include a plurality of second electrode patterns E2, in which a material of the second electrode layer 124 is preferably a transparent conductive material taking the light transmittance of the 2D/3D switchable display device 100 (shown in FIG. 1) and the prevention of the second electrode patterns E2 shielding the display image outputted by the display panel 110 (shown in FIG. 1) into consideration. The transparent conductive material can be a metal oxide, such as indium tin oxide (ITO), indium zinc oxide (IZO), aluminum zinc oxide (AZO), aluminum tin oxide (ATO), indium tin zinc oxide (ITZO), other applicable materials, or a stacked layer of at least two said materials.

Referring to FIG. 2E, the third substrate SUB3 and the first substrate SUB1 are boned and the switchable medium layer M2 (not shown here, with reference to FIG. 1) is formed between the third substrate SUB3 and the first substrate SUB1. Furthermore, in the embodiment, the sealants including conductive particles (not shown here, with reference to FIG. 1) can also be further formed between the first electrode layer 122 and the second electrode layer 124, and between the first electrode layer 122 and the OLB region 128. After being bonded, the first electrode layer 122 and the second electrode layer 124 are located between the third substrate SUB3 and the first substrate SUB1. In other embodiments, the injection of the switchable medium layer M2 can also be performed after the step depicted in FIG. 2N being completed.

Referring to FIG. 2F, the second carrier C2 is removed to expose the first surface S1. In the embodiment, the adhesive layer AD2 can also be removed at the same time while removing the second carrier C2.

Referring to FIG. 2G, in the embodiment, the color filter layer CF can be further formed on the first surface S1 of the first substrate SUB1, in which the color filter layer CF and the second electrode layer 124 are respectively located on the two opposite surfaces of the first substrate SUB1.

Referring to FIG. 2H and FIG. 2I, a cutting process S100 is performed on the first substrate SUB1 to form a plurality of uncompleted 2D/3D switchable display devices. In other embodiments, users can determine whether or not to perform the cutting process S100 according to actual requirement (such as the size of the panel).

Referring to FIG. 2J, the second substrate SUB2 is provided on a third carrier C3, in which the material and the thickness of the second substrate SUB2 can be the same as the third substrate SUB3, and the material and the thickness of the third carrier C3 can be the same as the first carrier C1. On the other hand, the third carrier C3 and the second substrate SUB2 of the embodiment can be bonded to each other through an adhesive layer AD3.

Referring to FIG. 2K, the active device layer ADL is formed on the second substrate SUB2, in which the active device layer ADL may include a plurality of active devices arranged in an array (not shown), and each of the active devices can be a thin film transistor (TFT), although the disclosure is not limited thereto.

Referring to FIG. 2L, the first substrate SUB1 and the second substrate SUB2 are bonded and the display medium layer M1 (not shown here, with reference to FIG. 1) is formed between the first substrate SUB1 and the second substrate SUB2, in which the first surface S1 is located between the second surface S2 and the active device layer ADL.

Referring to FIG. 2M, the first carrier C1 and the third carrier C3 are removed to expose an outer surface S3 of the third substrate SUB3 and an outer surface S4 of the second substrate SUB2. In the embodiment, the adhesive layers AD1 and AD3 can also be removed at the same time while removing the first carrier C1 and the third carrier C3.

Referring to FIG. 2N and FIG. 2O, cutting processes S200 and S300 are respectively performed on the second substrate SUB2 and the third substrate SUB3 to form a plurality of 2D/3D switchable display devices separated from each other, in which the first polarizing layer 130 can be further formed on the third substrate SUB3 (such as, on the outer surface S3 of the third substrate SUB3), and the second polarizing layer 140 can be formed on the second substrate SUB2 (such as, on the outer surface S4 of the second substrate SUB2), after the cutting processes S200 and S300 being performed. The first polarizing layer 130 and the first electrode layer 122 are respectively located on the two opposite surfaces of the third substrate SUB3, and the second polarizing layer 140 and the switch unit (including the third substrate SUB3, the first electrode layer 122, the second electrode layer 124 and the unshown switchable medium layer) are respectively located on the two opposite surfaces of the display panel (including the first substrate SUB1, the second substrate SUB2, the color filter layer CF, the active device layer ADL and the unshown display medium layer). Here, the 2D/3D switchable display device 100 depicted in FIG. 1 is completed.

Figure 3A:
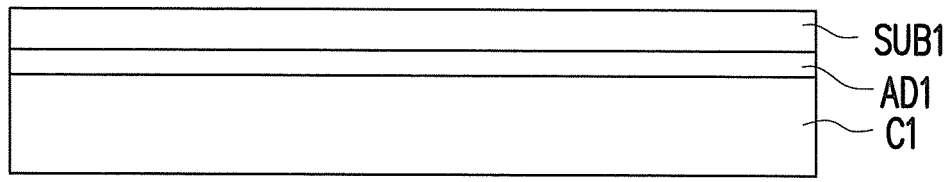
FIG. 3A through FIG. 3O are schematic diagrams illustrating a manufacturing process of a 2D/3D switchable display device in a cross-sectional view according to another embodiment of the disclosure.
Figure 3B:
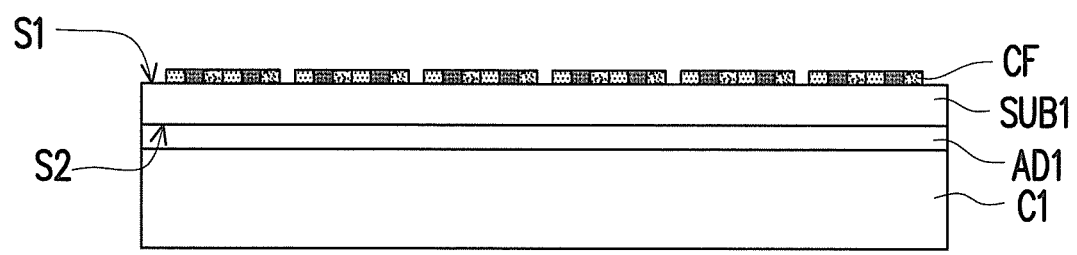
Figure 3C:
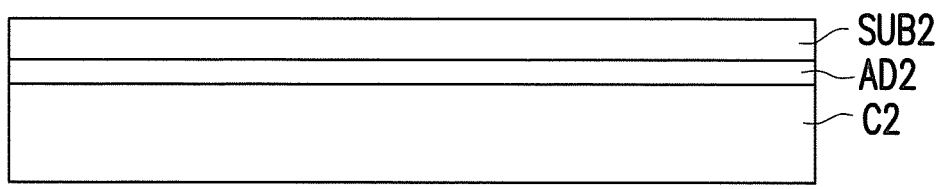
Figure 3D:
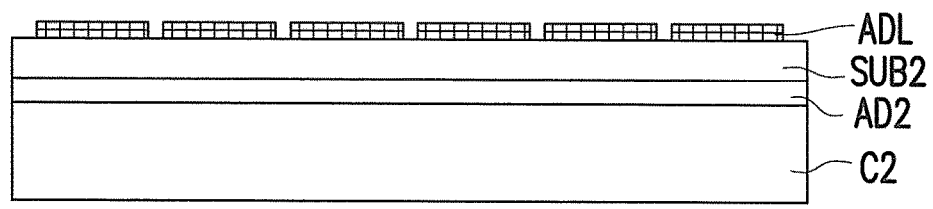
Figure 3E:
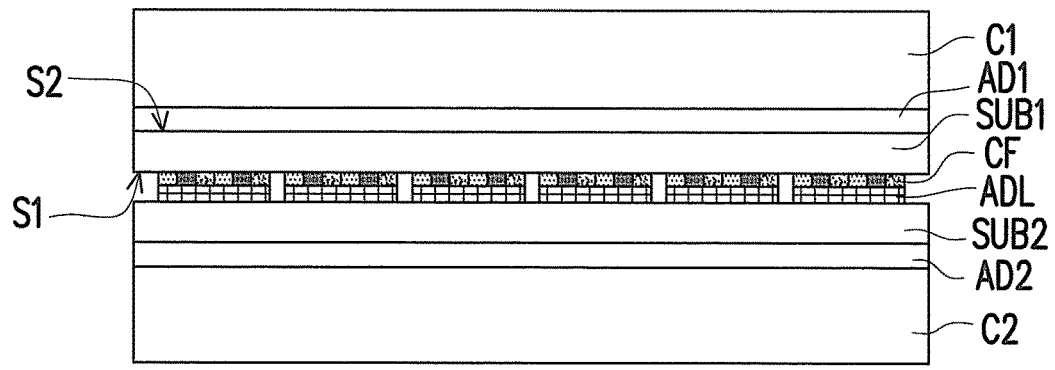
Figure 3F:
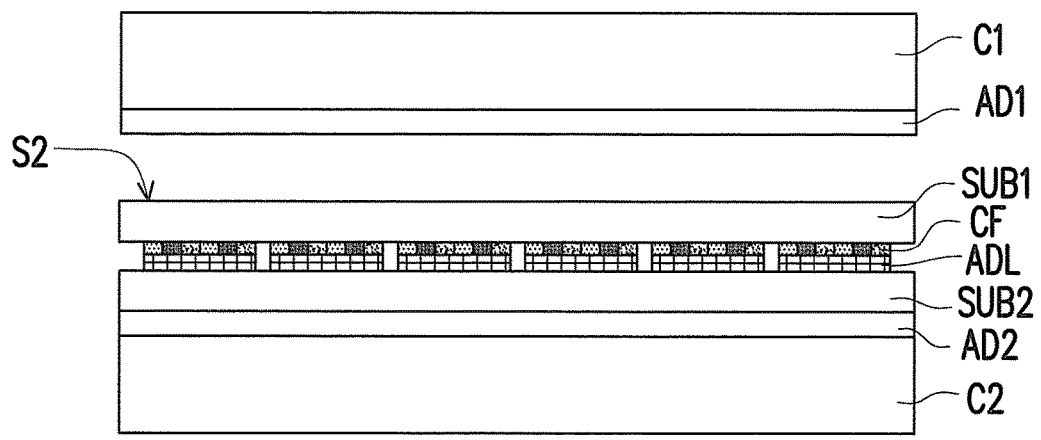
Figure 3G:
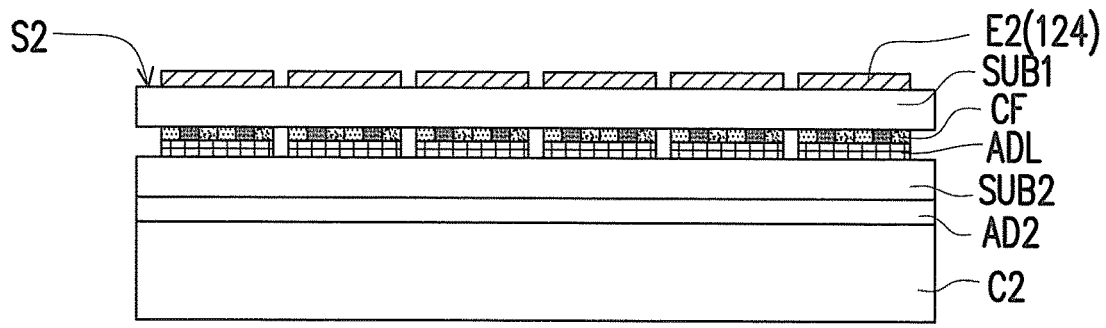
Figure 3H:
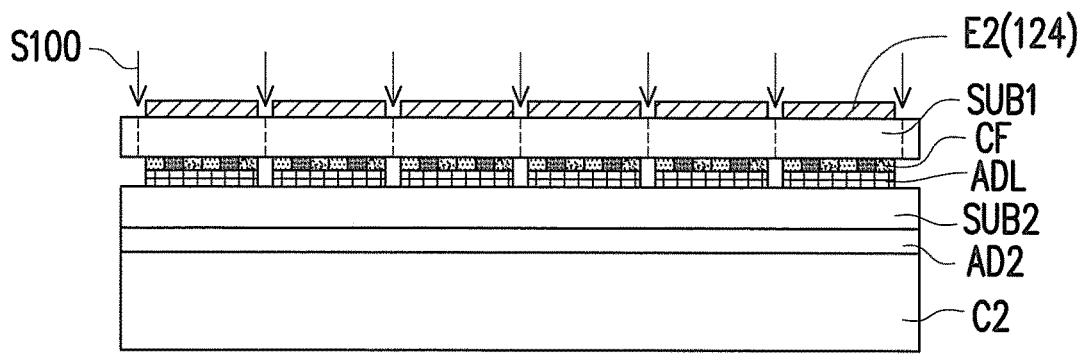
Figure 3I:
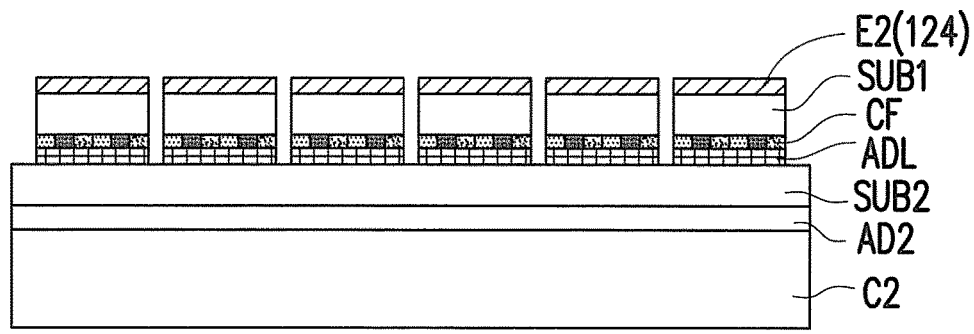
Figure 3J:
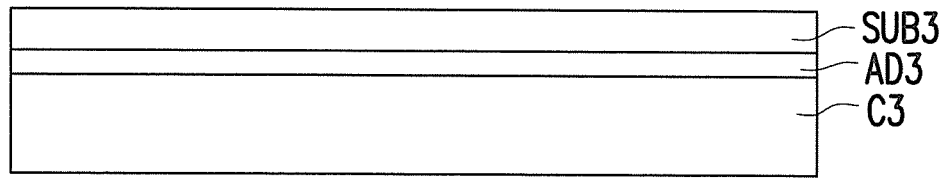
Figure 3K:
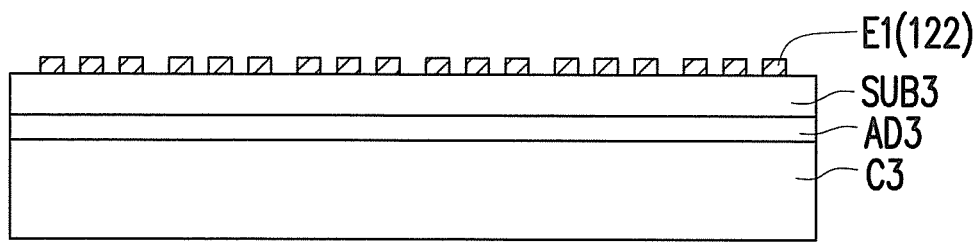
Figure 3L:
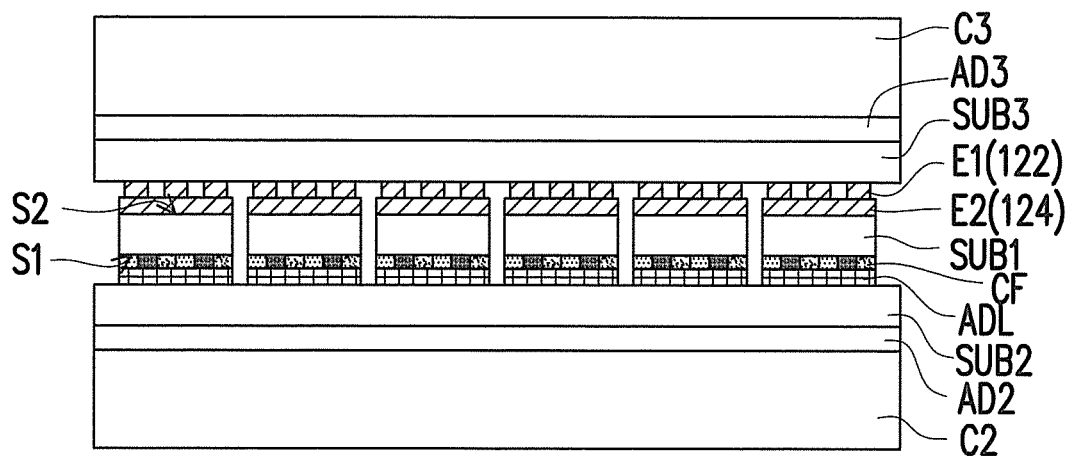
Figure 3M:
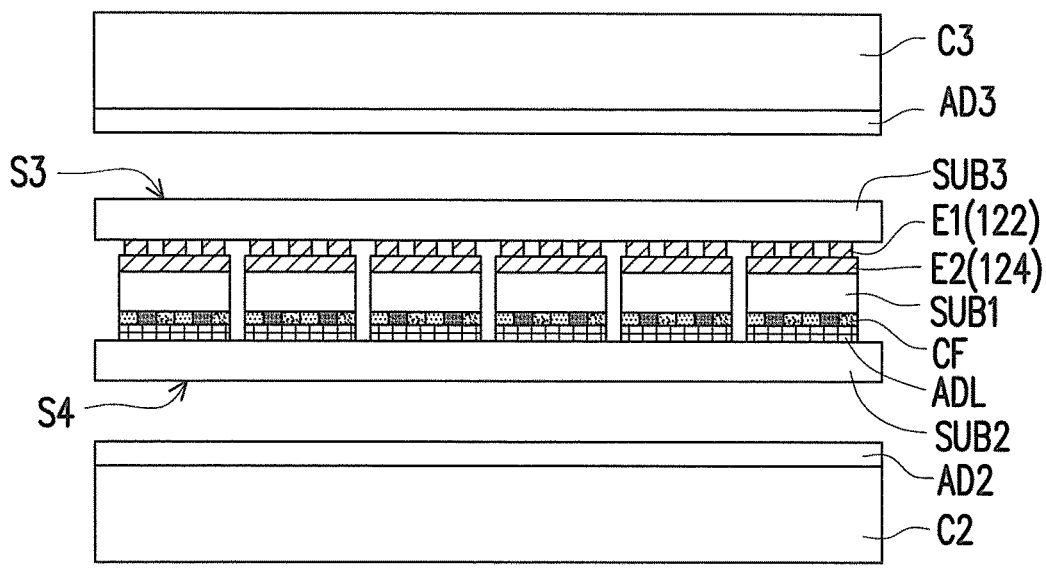
Figure 3N:
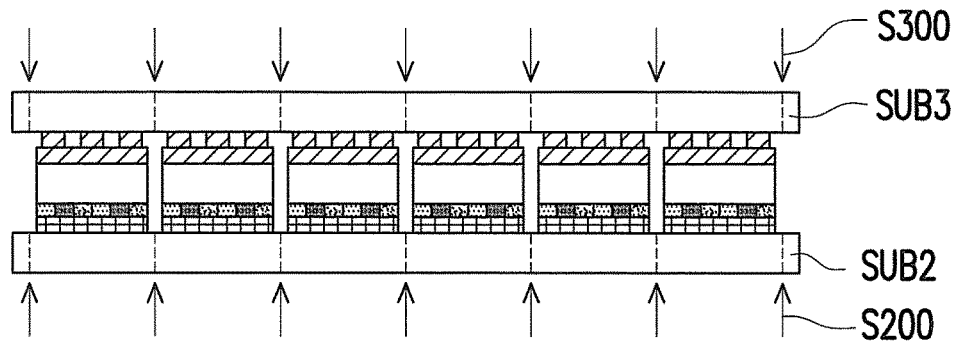
Figure 3O:
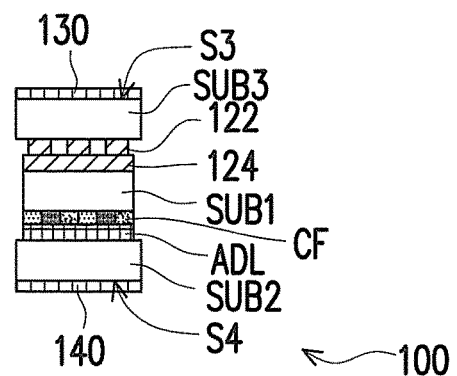

The following descriptions are taken FIG. 3A through FIG. 3O to illustrate another manufacturing process of the 2D/3D switchable display device 100 depicted in FIG. 1. In the embodiment (from FIG. 3A through FIG. 3O), the steps of forming the 2D/3D switchable display device 100 can be forming the display panel 110 (as shown in FIG. 3A through FIG. 3E) firstly, and then forming the switch unit 120 (as shown in FIG. 3F through FIG. 3L).

FIG. 3A through FIG. 3O are schematic diagrams illustrating a manufacturing process of a 2D/3D switchable display device in a cross-sectional view according to another embodiment of the disclosure. Referring to FIG. 3A, the first substrate SUB1 is provided on the first carrier C1, in which the material and the thickness of the first substrate SUB1 can be referred to the descriptions above, which is not repeated therein. In addition, the first carrier C1 and the first substrate SUB1 of the embodiment can be bonded to each other through the adhesive layer AD1. Referring to FIG. 3B, the color filter layer CF is formed on the first surface S1 of the first substrate SUB1, in which the first surface S1 is located between the color filter layer CF and the second surface S2.

Referring to FIG. 3C, the second substrate SUB2 is provided on the second carrier C2, in which the material and the thickness of the first substrate SUB1 can be referred to the descriptions above, which is not repeated therein. In addition, the second carrier C2 and the second substrate SUB2 of the embodiment can be bonded to each other through the adhesive layer AD2. Referring to FIG. 3D, the active device layer ADL is formed on the second substrate SUB2.

Referring to FIG. 3E, the first substrate SUB1 and the second substrate SUB2 are bonded and the display medium layer M1 (not shown here, with reference to FIG. 1) is formed between the first substrate SUB1 and the second substrate SUB2, in which the first surface S1 is located between the second surface S2 and the active device layer ADL. In other embodiments, the injection of the display medium layer M1 can also be performed after the step depicted in FIG. 3N being completed.

Referring to FIG. 3F, the first carrier C1 is removed to expose the second surface S2. In the embodiment, the adhesive layer AD1 can also be removed at the same time while removing the first carrier C1.

Referring to FIG. 3G, the second electrode layer 124 is formed on the second surface S2 of the first substrate SUB1, and in the embodiment, the OLB region (not shown here, with reference to FIG. 1) can be further formed on a region outside the second electrode layer 124 on the second surface S2, in which the material of the second electrode layer 124 can be referred to the descriptions above, which is not repeated therein.

Referring to FIG. 3H and FIG. 3I, the cutting process S100 is performed on the first substrate SUB1 to form a plurality of uncompleted 2D/3D switchable display devices. In other embodiments, users can determine whether or not to perform the cutting process S100 according to actual requirement (such as the size of the panel).

Referring to FIG. 3J, the third substrate SUB3 is provided on the third carrier C3, in which the material and the thickness of the third substrate SUB3 can be referred to the descriptions above, which is not repeated therein. In addition, the third carrier C3 and the third substrate SUB3 of the embodiment can be bonded to each other through the adhesive layer AD3. Referring to FIG. 3K, the first electrode layer 122 is formed on the third substrate SUB3, in which the material of the first electrode layer 122 can be referred to the descriptions above, which is not repeated therein.

Referring to FIG. 3L, the first substrate SUB1 and the third substrate SUB3 are bonded and the switchable medium layer M2 (not shown here, with reference to FIG. 1) is formed between the first substrate SUB1 and the third substrate SUB3. Furthermore, in the embodiment, the sealants including conductive particles (not shown here, with reference to FIG. 1) can also be further formed between the first electrode layer 122 and the second electrode layer 124, and between the first electrode layer 122 and the OLB region 128. After being bonded, the second surface S2 is located between the first surface S1 and the first electrode layer 122.

Referring to FIG. 3M, the third carrier C3 and the second carrier C2 are removed to expose the outer surface S3 of the third substrate SUB3 and the outer surface S4 of the second substrate SUB2. In the embodiment, the adhesive layers AD1 and AD3 can also be removed at the same time while removing the first carrier C1 and the third carrier C3.

Referring to FIG. 3N and FIG. 3O, the cutting processes S200 and S300 are respectively performed on the second substrate SUB2 and the third substrate SUB3 to form a plurality of 2D/3D switchable display devices separated from each other, in which the first polarizing layer 130 can be further formed on the third substrate SUB3 (such as, on the outer surface S3 of the third substrate SUB3), and the second polarizing layer 140 can be formed on the second substrate SUB2 (such as, on the outer surface S4 of the second substrate SUB2), after the cutting processes S200 and S300 being performed. Here, the 2D/3D switchable display device 100 depicted in FIG. 1 is completed.

In another embodiment, the 2D/3D switchable display device 100 may further include a touch sensing layer. By this way, other than having the 2D/3D display effect, the 2D/3D switchable display device 100 may further have the touch-sensing ability. The following descriptions are taken FIG. 4A and FIG. 4B to illustrate a manufacturing process of an in-cell touch sensing layer, and taken FIG. 5A through FIG. 5E to illustrate a manufacturing process of an on-cell touch sensing layer disposed on the outer surface S3 of the third substrate SUB3.

Figure 4A:
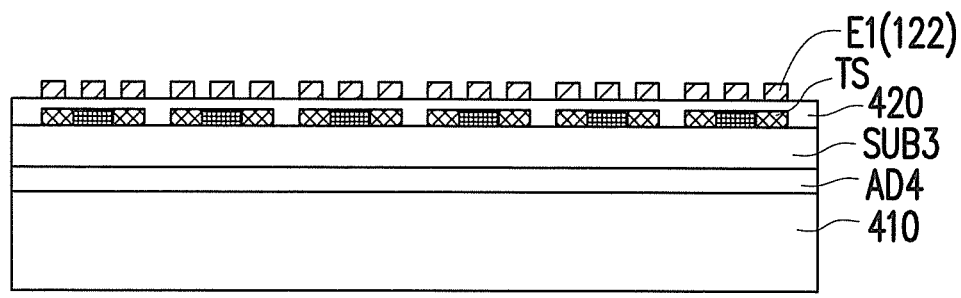
FIG. 4A and FIG. 4B are schematic diagrams illustrating a manufacturing process of a 2D/3D switchable display device in a cross-sectional view according to another embodiment of the disclosure.
Figure 4B:
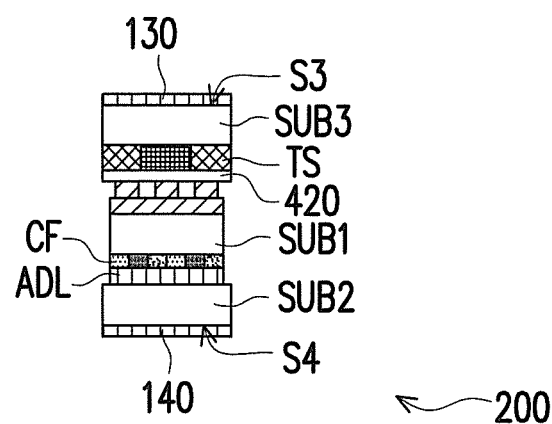

FIG. 4A and FIG. 4B are schematic diagrams illustrating a manufacturing process of a 2D/3D switchable display device in a cross-sectional view according to another embodiment of the disclosure. Referring to FIG. 4A and FIG. 4B, the 2D/3D switchable display device 200 of the embodiment may have an in-cell touch sensing layer TS, in which the touch sensing layer TS and the first electrode layer 122 are located on a same surface of the third substrate SUB3, and the touch sensing layer TS is located between the first electrode layer 122 and the third substrate SUB3. In addition, the manufacturing process of the 2D/3D switchable display device 200 may employ the afore-described manufacturing process of the 2D/3D switchable display device 100, in which when the manufacturing process of FIG. 2A through FIG. 2O is employed to form the 2D/3D switchable display device 200, the touch sensing layer TS can be formed in the step depicted in FIG. 2B, and when the manufacturing process of FIG. 3A through FIG. 3O is employed to form the 2D/3D switchable display device 200, the touch sensing layer TS can be formed in the step depicted in FIG. 3K.

Specifically, the touch sensing layer TS can be formed before the first electrode layer 122. Referring to FIG. 4A, the method of forming the touch sensing layer TS and the first electrode layer 122 includes the following steps. The third substrate SUB3 is provided on a temporary carrier 410, in which the temporary carrier 410 can be the first carrier C1 depicted in FIG. 2B or the third carrier C3 depicted in FIG. 3K, and the temporary carrier 410 and the third substrate SUB3 are bonded to each other via an adhesive layer AD4. Subsequently, the touch sensing layer TS is formed on the third substrate SUB3. After the touch sensing layer TS is formed, the first electrode layer 122 is formed on the third substrate SUB3, in which the touch sensing layer TS is located between the first electrode layer 122 and the third substrate SUB3, and the first electrode layer 122 and the touch sensing layer TS are electrically insulated. For instance, the method of electrically insulating the first electrode layer 122 and the touch sensing layer TS in the embodiment is to utilize an insulating layer 420 to fully cover the touch sensing layer TS before forming the first electrode layer 122, and then to form the first electrode layer 122 on the insulating layer TS. After the step depicted in FIG. 4A is completed, the steps depicted in FIG. 2C through FIG. 2O or the steps depicted in FIG. 3L through FIG. 3O can be followed, such that the 2D/3D switchable display device 200 depicted in FIG. 4B can be completed.

In another embodiment, the 2D/3D switchable display device may also include the on-cell touch sensing layer TS disposed on the outer surface S3 of the third substrate SUB3. FIG. 5A through FIG. 5E are schematic diagrams illustrating a manufacturing process of a 2D/3D switchable display device in a cross-sectional view according to yet another embodiment of the disclosure. Referring to FIG. 5A through FIG. 5E, the touch sensing layer TS and the first electrode layer 122 in the 2D/3D switchable display device 300 of the embodiment are respectively located on the two opposite surfaces of the third substrate SUB3. In addition, the manufacturing process of the 2D/3D switchable display device 300 may employ the afore-described manufacturing process of the 2D/3D switchable display device 100, in which when the manufacturing process of FIG. 2A through FIG. 2O is employed to form the 2D/3D switchable display device 300, the touch sensing layer TS can be formed in the step depicted in FIG. 2B, and when the manufacturing process of FIG. 3A through FIG. 3O is employed to form the 2D/3D switchable display device 300, the touch sensing layer TS can be formed in the step depicted in FIG. 3K.

Figure 5A:
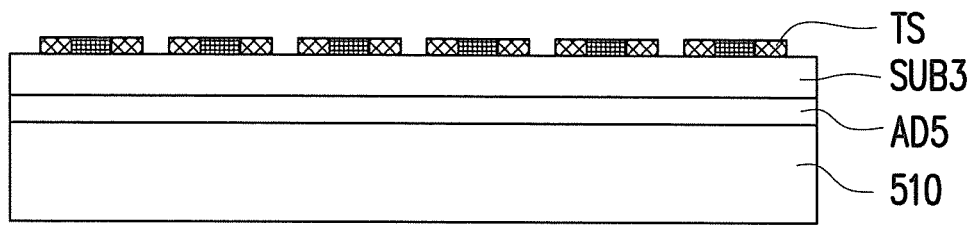
FIG. 5A through FIG. 5E are schematic diagrams illustrating a manufacturing process of a 2D/3D switchable display device in a cross-sectional view according to yet another embodiment of the disclosure.

Specifically, the touch sensing layer TS of the embodiment can also be formed before the first electrode layer 122, and the method of forming the touch sensing layer TS and the first electrode layer 122 includes the steps depicted in FIG. 5A through FIG. 5D (that is, the steps depicted in FIG. 5A through FIG. 5D are taken to replace the step depicted in FIG. 2B or the step depicted in FIG. 3K). Referring to FIG. 5A, the third substrate SUB3 is provided on a temporary carrier 510, and the temporary carrier 510 and the third substrate SUB3 are bonded to each other via an adhesive layer AD5, for instance.

Figure 5B:
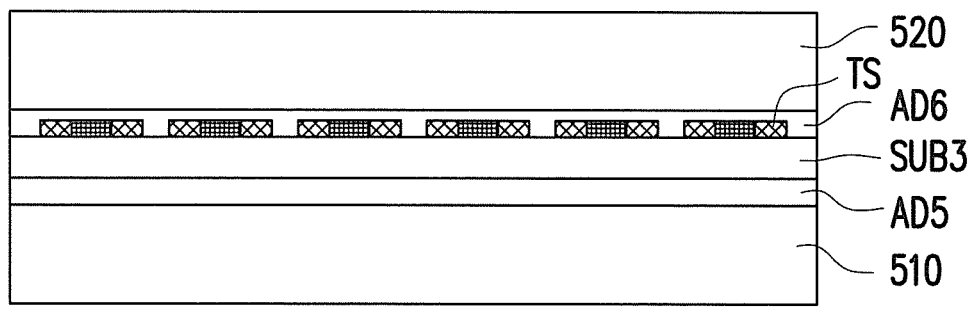

Referring to FIG. 5B, the touch sensing layer TS is formed on the third substrate SUB3, and the third substrate SUB3 is bonded with a carrier 520, in which the third substrate SUB3 and the carrier 520 of the embodiment are bonded to each other via an adhesive layer AD6. The carrier 520 can be the first carrier C1 depicted in FIG. 2B or the third carrier C3 depicted in FIG. 3K. After the third substrate SUB3 and the carrier 520 are bonded, the touch sensing layer TS is located between the third substrate SUB3 and the carrier 520.

Figure 5C:
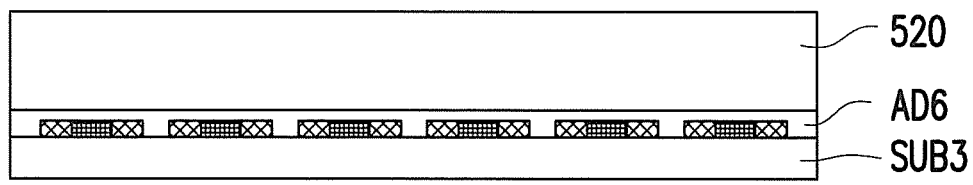
Figure 5C:
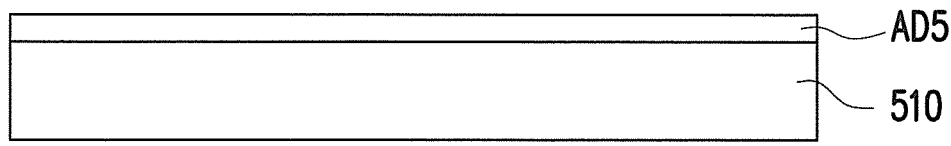

Referring to FIG. 5C, the temporary carrier 510 is removed to expose the outer surface S3 of the third substrate SUB3. In addition, the adhesive layer AD5 can be removed at the same time while removing the temporary carrier 510.

Figure 5D:
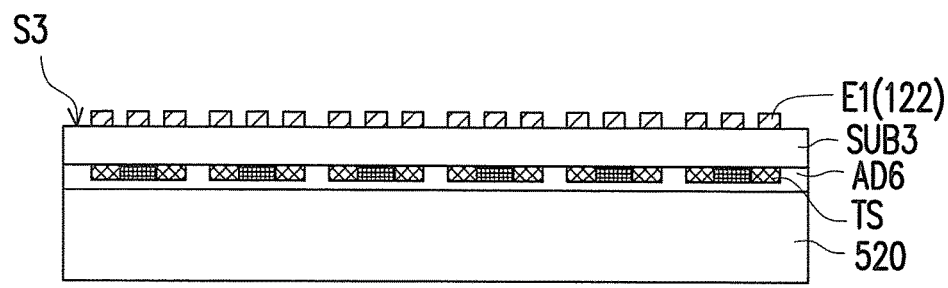

Referring to FIG. 5D, the first electrode layer 122 is formed on a surface (i.e., the outer surface S3) of the third substrate SUB3 being separated from the temporary carrier 510. Subsequently, the steps depicted in FIG. 2C through FIG. 2O or the steps depicted in FIG. 3L through FIG. 3O can be followed, such that the 2D/3D switchable display device 300 depicted in FIG. 5E can be completed.

The following descriptions are taken FIG. 6 through FIG. 12 to illustrate other implementations of the 2D/3D switchable display device in the disclosure. FIG. 6 through FIG. 12 are schematic cross-sectional diagrams illustrating a 2D/3D switchable display device according to other embodiments of the disclosure.

Figure 5E:
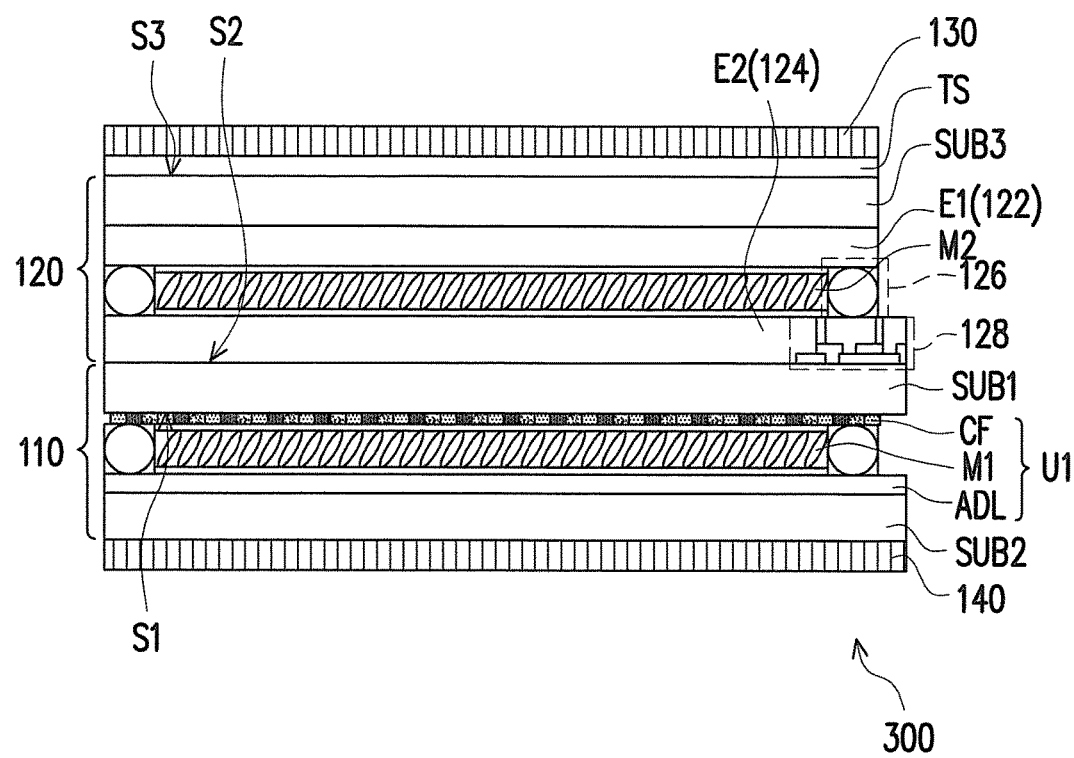
Figure 6:
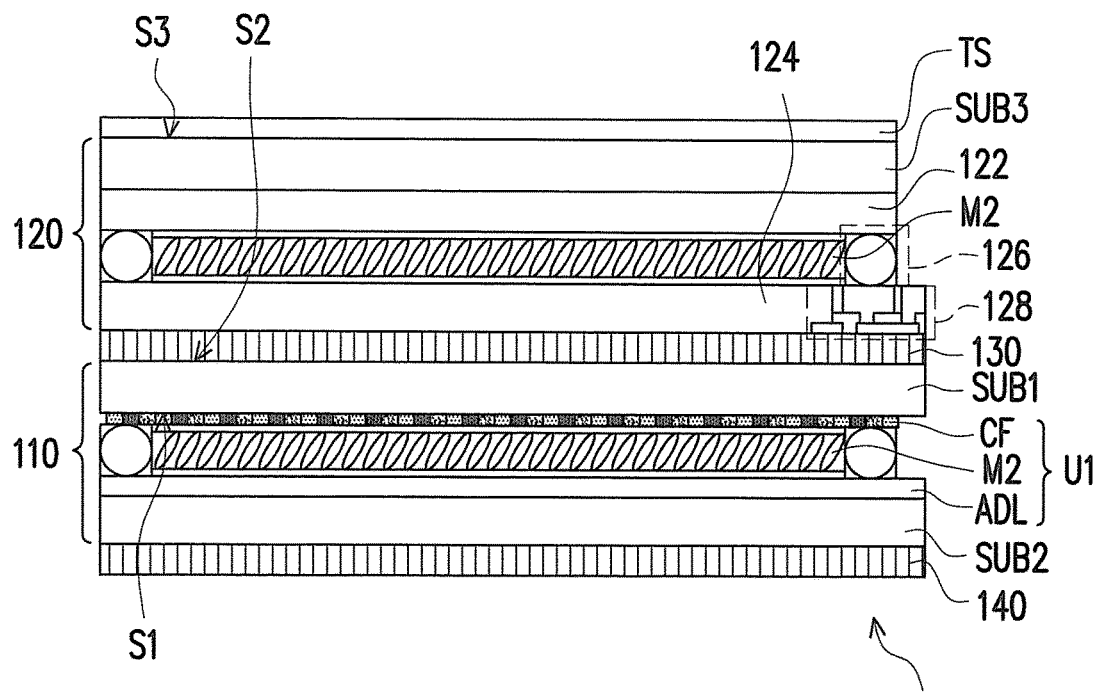
FIG. 6 through FIG. 12 are schematic cross-sectional diagrams illustrating a 2D/3D switchable display device according to other embodiments of the disclosure.

Referring to FIG. 6, the layers and the manufacturing process of the 2D/3D switchable display device 400 in the embodiment are similar to the 2D/3D switchable display device 300 depicted in FIG. 5E, except the first polarizing layer 130 of the 2D/3D switchable display device 400 in the embodiment is located on the second surface S2 of the first substrate SUB1, and is in direct contact with the second surface S2. Namely, the first polarizing layer 130 of the embodiment is located between the display panel 110 and the switch unit 120.

To be more specific, in the manufacturing process of the 2D/3D switchable display device 400, the first polarizing layer 130 can be further formed on the second surface S2 of the first substrate SUB1 before forming the switch unit 120 on the second surface S2 of the first substrate SUB1. Specifically, in the step depicted in FIG. 2D or FIG. 3G, the first polarizing layer 130 may be firstly formed on the second surface S2 before forming the second electrode layer 124, and then the second electrode layer 124 is formed.

Figure 7:
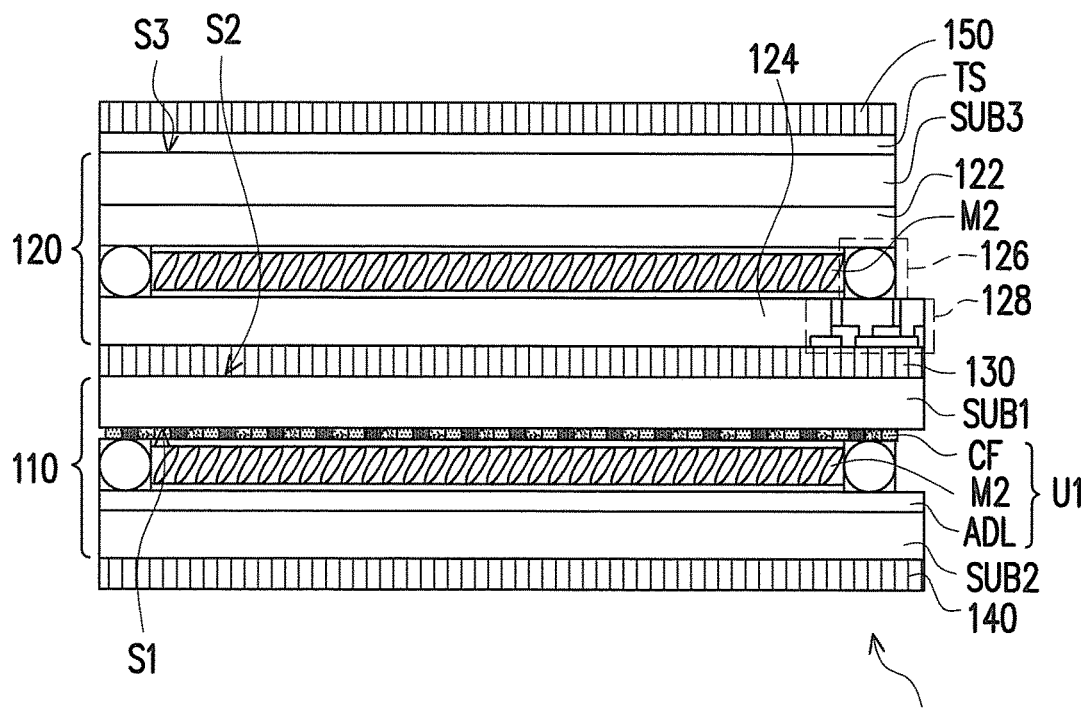

Referring to FIG. 7, the layers and the manufacturing process of the 2D/3D switchable display device 500 in the embodiment are similar to the 2D/3D switchable display device 400 depicted in FIG. 6, except the 2D/3D switchable display device 500 of the embodiment further includes a third polarizing layer 150 located on the switch unit 120, in which the third polarizing layer 150 and the first electrode layer 122 are respectively located on the two opposite surfaces of the third substrate SUB3.

Figure 8:
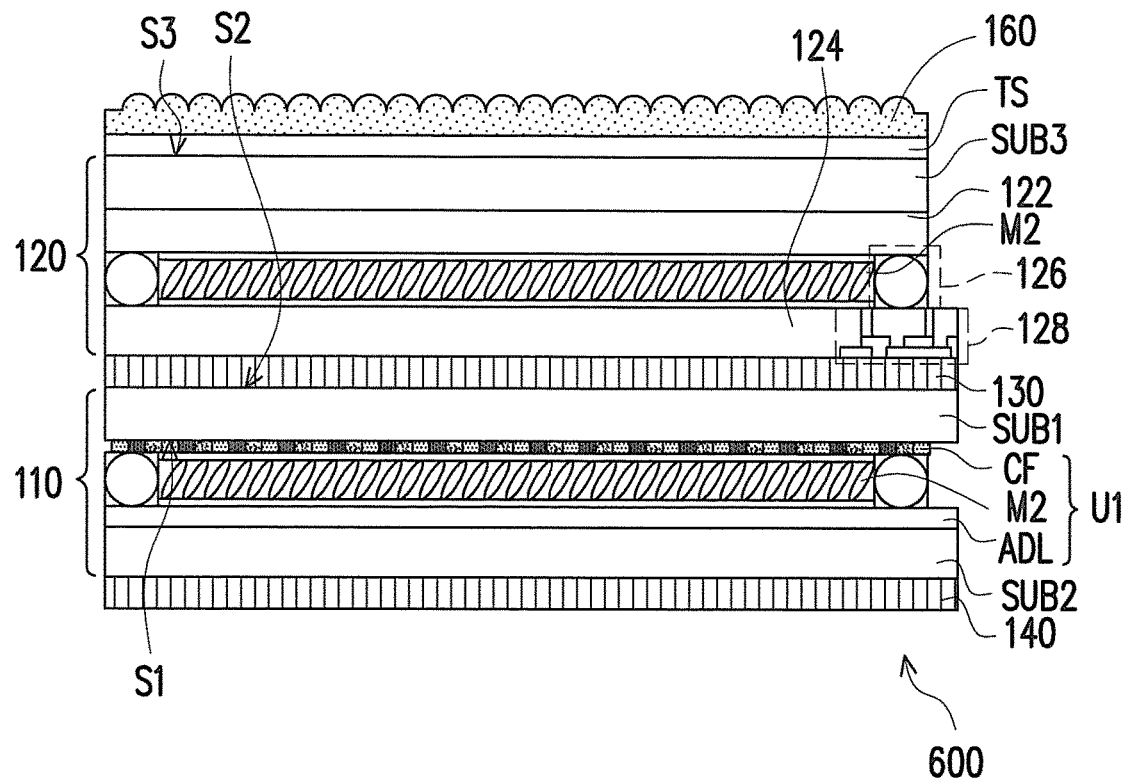
Figure 9:
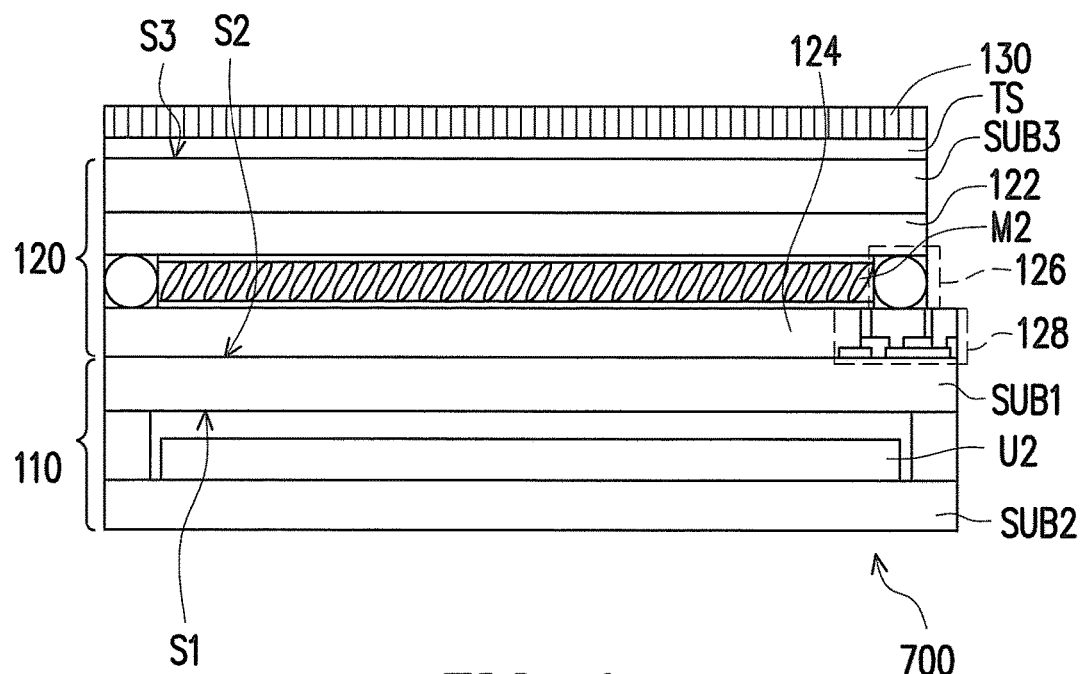
Figure 10:
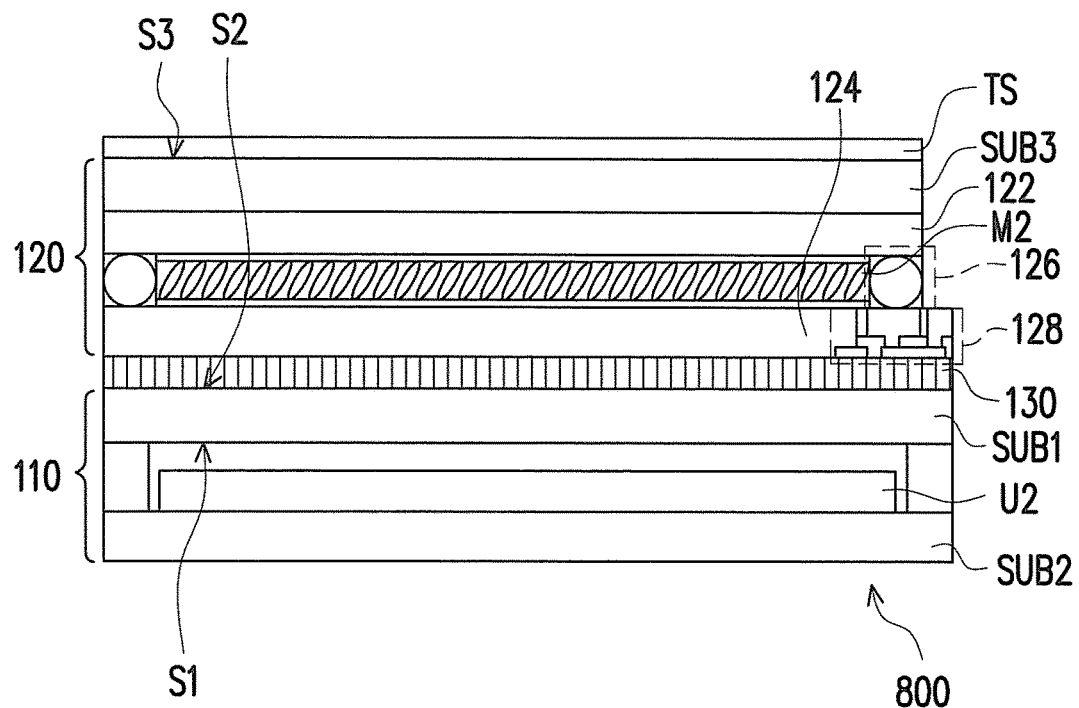
Figure 11:
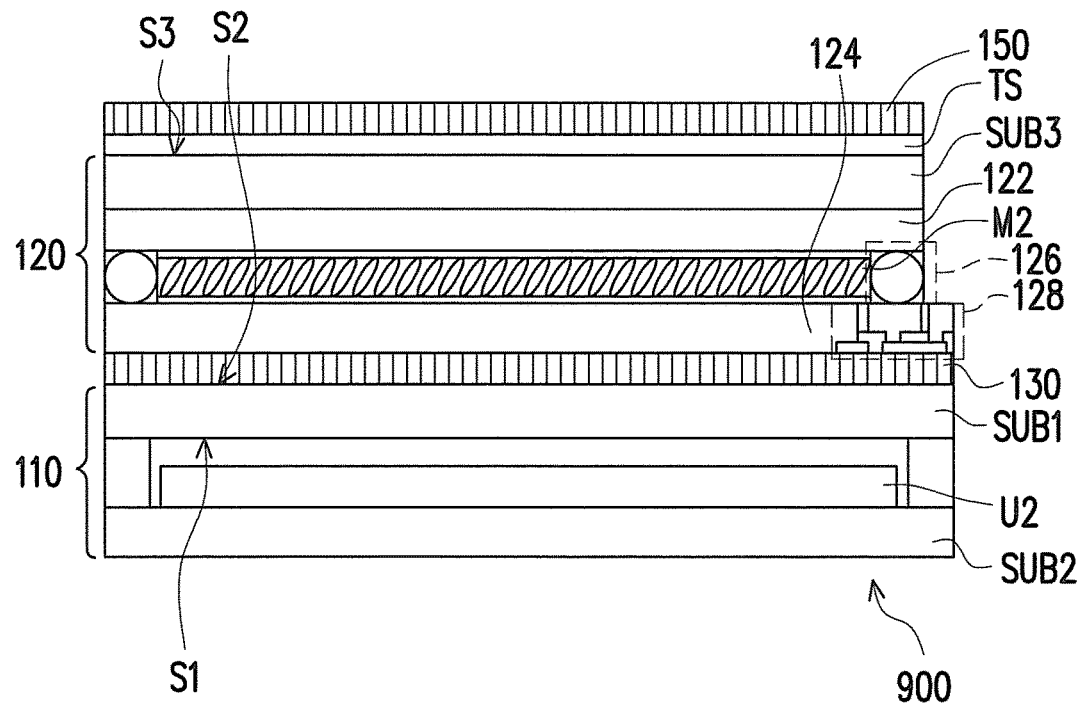
Figure 12:
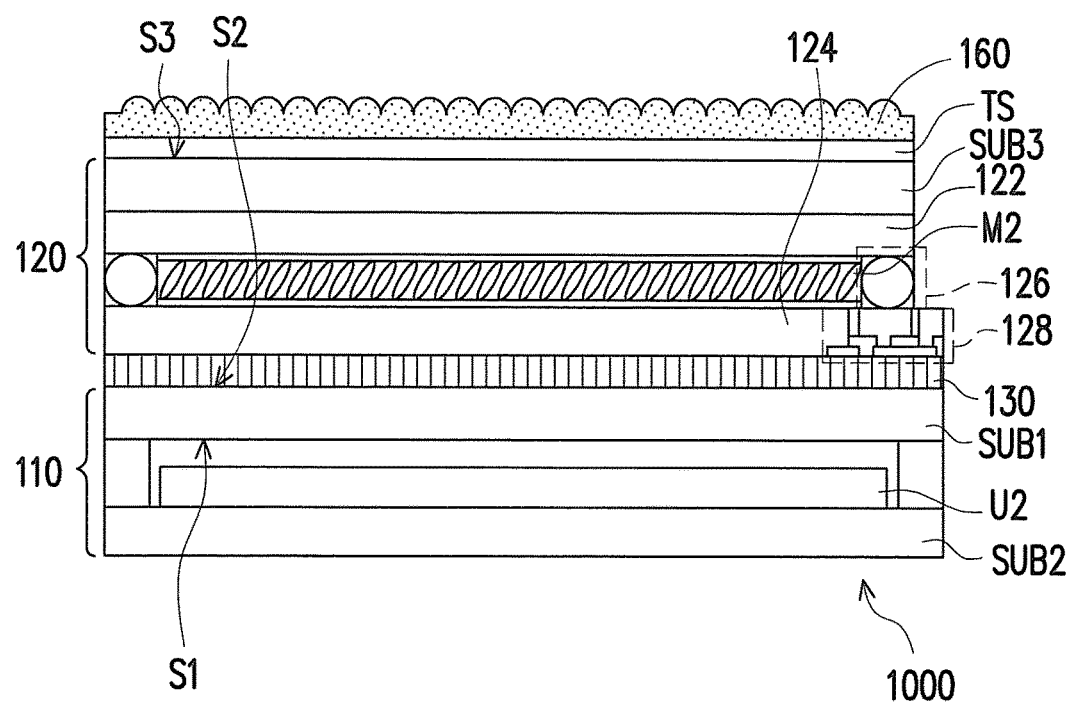

To be more specific, in the manufacturing process of the 2D/3D switchable display device 500, the third polarizing layer 150 can be further formed on the third substrate SUB3 after forming the display panel 110 and the switch unit 120. Specifically, in the embodiment, the third polarizing layer 150 can be formed on the third substrate SUB3 (such as, on the outer surface S3 of the third substrate SUB3) after the cutting processes S200 and S300 depicted in FIG. 2N or FIG. 3N. In addition, under the condition that the 2D/3D switchable display device 500 has the touch-sensing ability (i.e., with the configuration of the touch sensing layer TS), the third polarizing layer 150 is formed on the touch sensing layer TS, and the touch sensing layer TS is located between the third polarizing layer 150 and the third substrate SUB3. In the embodiment, the cooperation of the third polarizing layer 150 and the switch unit 120 may have the splitting ability, although the disclosure is not limited thereto. In another embodiment, as shown in FIG. 8, the third polarizing layer 150 can be replaced by a lenticular lens layer 160 which has the same splitting ability, in which the formation step of the lenticular lens layer 160 can be referred to the formation step of the third polarizing layer 150, which is not repeated therein.

The embodiments depicted in FIG. 1 through FIG. 8 are taken the liquid crystal display panel to illustrate the implementations of the display panel in the 2D/3D switchable display device, although the disclosure is not limited thereto. FIG. 9 through FIG. 12 illustrate the implementations of the display panel being the organic electroluminescent display panel in the 2D/3D switchable display device. In the embodiments depicted in FIG. 9 through FIG. 12, the layers and the manufacturing processes of the 2D/3D switchable display devices 700, 800, 900 and 1000 are respectively similar to the 2D/3D switchable display devices 300, 400, 500 and 600 depicted in FIG. 5E through FIG. 8, except the display panels 110A of the 2D/3D switchable display devices 700, 800, 900, 1000 are the organic electroluminescent display panels, such that the second polarizing layer 140 and the color filter layer CF depicted in FIG. 5E through FIG. 8 are not needed to be disposed in the 2D/3D switchable display devices 700, 800, 900, 1000. In addition, the display units U2 in the display panels 110A of the 2D/3D switchable display devices 700, 800, 900, 1000 may include an active device layer (not shown) and a display device layer (not shown), in which the display device layer may include an upper electrode layer, a lower electrode layer and an organic light-emitting layer located between the upper electrode layer and the lower electrode layer, for instance.

Moreover, the display units U2 depicted in FIG. 9 through FIG. 12 are located between the first substrate SUB1 and the second substrate SUB2. Specifically, in the embodiments depicted in FIG. 9 through FIG. 12, the display unit U2 can be fabricated on the first surface S1 of the first substrate SUB1, or can be fabricated on the second substrate SUB2. When the display unit U2 is fabricated on the first surface S1, the display panel 110A can be a bottom-emission display panel 110A. On the other hand, when the display unit U2 is fabricated on the second substrate SUB2, the display panel 110A can be a top-emission display panel 110A. Thus, the light emitted from the display panel 110A can be respectively projected to the left and right eyes of the user under the control of the switch unit 120, and a 3D image is formed in the human brain. By this way, the 2D/3D switchable display devices 700, 800, 900, 1000 are capable of displaying 2D images when the switch unit 120 is turned off (such as, under the condition that no voltage being applied to the first electrode layer 122 and the second electrode layer 124 of the switch unit 120, or both electrode layers are equipotential) and displaying 3D images when the switch unit 120 is turned on on (which indicates the potential states of the first electrode layer 122 and the second electrode layer 124 in the switch unit 120 varies with time, so as to have the splitting ability equivalent to the lenticular lens).

In the embodiments depicted in FIG. 6 through FIG. 12, the number of the required substrates in the 2D/3D switchable display devices 400, 500, 600, 700, 800, 900, 1000 of the embodiments depicted in FIG. 6 through FIG. 12 can also be reduced by disposing the second electrode layer 124 of the switch unit 120 on the first substrate SUB1 of the display panel 110. Thus, as compared with the existing 2D/3D switchable display device constituted by having the display panel with two substrates and the switch unit with two substrates stacked to each other, the 2D/3D switchable display devices 400, 500, 600, 700, 800, 900, 1000 of the embodiments depicted in FIG. 6 through FIG. 12 can have a relatively low number of substrates (i.e., including the first substrate SUB1, the second substrate SUB2 and the third substrate SUB3), thereby having a relative thin overall thickness.

Moreover, the overall thickness of the 2D/3D switchable display devices 400, 500, 600, 700, 800, 900, 1000 can be further reduced by thinning these substrates (i.e., including the first substrate SUB1, the second substrate SUB2 and the third substrate SUB3) of the 2D/3D switchable display devices 400, 500, 600, 700, 800, 900, 1000. To be more specific, the substrates may employ flexible substrates with a thickness below 0.2 mm. By this way, other than reducing the overall thickness of the 2D/3D switchable display devices 400, 500, 600, 700, 800, 900, 1000, the applications of the 2D/3D switchable display devices 400, 500, 600, 700, 800, 900, 1000 can be further increased and their commercial competitiveness can also be increased.

It should be noted that, although the afore-described touch sensing layers TS disposed on the outer surface S3 of the third substrate SUB3 (as being on-cell) in the 2D/3D switchable display devices 400, 500, 600, 700, 800, 900, 1000 are taken to illustrate, the 2D/3D switchable display devices 400, 500, 600, 700, 800, 900, 1000 in other embodiments may also not include the touch sensing layers TS, or alternatively the touch sensing layers TS of the 2D/3D switchable display devices 400, 500, 600, 700, 800, 900, 1000 may be disposed between the first electrode layer 122 and the third substrate SUB3 (as being in-cell).

In summary, the number of the required substrates in the 2D/3D switchable display device of the disclosure can be reduced by disposing the second electrode layer of the switch unit on the first substrate of the display panel. Thus, as compared with the existing 2D/3D switchable display device constituted by having the display panel with two substrates and the switch unit with two substrates stacked to each other, the 2D/3D switchable display device of the disclosure can have a relatively low number of substrates, thereby having a relative thin overall thickness.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A manufacturing method of a two-dimensional/three-dimensional (2D/3D) switchable display device, comprising:

forming a display unit between a first substrate and a second substrate to form a display panel, wherein the first substrate has a first surface and a second surface opposite to the first surface, and the display unit is located above the first surface; and forming a switch unit on the second surface of the first substrate, the switch unit comprising a third substrate, a first electrode layer, a second electrode layer and a switchable medium layer located between the first electrode layer and the second electrode layer, wherein the second electrode layer is located on the second surface, the first electrode layer is located on the third substrate, and the switchable medium layer and the third substrate are respectively located on two opposite surfaces of the first electrode layer, wherein the method of forming the switch unit comprises:

providing the third substrate on a first carrier;
forming the first electrode layer on the third substrate;
providing the first substrate on a second carrier, wherein the first surface is located between the second carrier and the second surface;
forming the second electrode layer on the second surface of the first substrate;
bonding the third substrate with the first substrate, wherein the first electrode layer and the second electrode layer are located between the third substrate and the first substrate; and
forming the switchable medium layer between the third substrate and the first substrate.

2. The manufacturing method of the 2D/3D switchable display device according to claim 1, wherein the method of forming the display panel comprises:
removing the second carrier to expose the first surface;
providing the second substrate on a third carrier;
forming an active device layer on the second substrate;
bonding the first substrate with the second substrate, wherein the first surface is located between the second surface and the active device layer; and
forming a display medium layer between the first substrate and the second substrate.

3. The manufacturing method of the 2D/3D switchable display device according to claim 2, after removing the second carrier and before bonding the first substrate with the second substrate, further comprising:
forming a color filter layer on the first surface of the first substrate, wherein the color filter layer and the second electrode layer are respectively located on the two opposite surfaces of the first substrate.

4. The manufacturing method of the 2D/3D switchable display device according to claim 1, further comprising:
forming a touch sensing layer on the third substrate, wherein the method of forming the touch sensing layer and the first electrode layer comprises:
providing the third substrate on a temporary carrier;
forming the touch sensing layer on the third substrate; and
forming the first electrode layer on the third substrate, wherein the touch sensing layer located between the third substrate and the first electrode layer, and the first electrode layer and the touch sensing layer are electrically insulated.

5. The manufacturing method of the 2D/3D switchable display device according to claim 1, further comprising:
forming a touch sensing layer on the third substrate, wherein the touch sensing layer and the first electrode layer are respectively located on two opposite surfaces of the third substrate, and the method of forming the touch sensing layer comprises:
providing the third substrate on a temporary carrier;
forming the touch sensing layer on the third substrate;
bonding the third substrate with a carrier;
removing the temporary carrier; and
forming the first electrode layer on the surface of the third substrate being separated from the temporary carrier.

6. The manufacturing method of the 2D/3D switchable display device according to claim 1, before forming the switch unit on the second surface of the first substrate, further comprising:
forming a first polarizing layer on the second surface of the first substrate.

7. The manufacturing method of the 2D/3D switchable display device according to claim 6, after forming the display panel and the switch unit, further comprising:
forming a second polarizing layer on the second substrate of the display panel, wherein the second polarizing layer and the switch unit are respectively located on two opposite surfaces of the display panel.

8. The manufacturing method of the 2D/3D switchable display device according to claim 7, after forming the display panel and the switch unit, further comprising:
forming a lenticular lens layer on the third substrate, wherein the lenticular lens layer and the first electrode layer are respectively located on two opposite surfaces of the third substrate.

9. The manufacturing method of the 2D/3D switchable display device according to claim 7, after forming the display panel and the switch unit, further comprising:
forming a third polarizing layer on the third substrate, wherein the third polarizing layer and the first electrode layer are respectively located on two opposite surfaces of the third substrate, and the first polarizing layer is located between the display panel and the switch unit.

10. The manufacturing method of the 2D/3D switchable display device according to claim 6, after forming the display panel and the switch unit, further comprising:
forming a lenticular lens layer on the third substrate, wherein the lenticular lens layer and the first electrode layer are respectively located on two opposite surfaces of the third substrate.

11. The manufacturing method of the 2D/3D switchable display device according to claim 6, after forming the display panel and the switch unit, further comprising:
forming a second polarizing layer on the third substrate, wherein the second polarizing layer and the first electrode layer are respectively located on two opposite surfaces of the third substrate, and the first polarizing layer is located between the display panel and the switch unit.

12. The manufacturing method of the 2D/3D switchable display device according to claim 1, after forming the display panel and the switch unit, further comprising:
forming a first polarizing layer on the third substrate, wherein the first polarizing layer and the first electrode layer are respectively located on two opposite surfaces of the third substrate.

13. The manufacturing method of the 2D/3D switchable display device according to claim 12, after forming the display panel and the switch unit, further comprising:
forming a second polarizing layer on the second substrate of the display panel, wherein the second polarizing layer and the switch unit are respectively located on two opposite surfaces of the display panel.

* * * * *